United States Patent [19]
Zellmer

[11] 3,970,871
[45] July 20, 1976

[54] NEGATIVE DC TO POSITIVE DC CONVERTER
[75] Inventor: Neale A. Zellmer, Belmont, Calif.
[73] Assignee: GTE Automatic Electric Laboratories Incorporated, Northlake, Ill.
[22] Filed: Feb. 19, 1974
[21] Appl. No.: 443,587

[52] U.S. Cl. .............................. 307/262; 307/296; 307/300; 321/2
[51] Int. Cl.² ........................................ H03K 1/12
[58] Field of Search .................. 307/262, 296, 300; 321/2

[56] References Cited
UNITED STATES PATENTS
3,320,511 8/1970 Tiemann ................................ 321/2
3,824,408 7/1974 Brunel ............................ 307/300 X
3,872,327 3/1975 Rudert et al. ......................... 307/300

OTHER PUBLICATIONS
Gerald Olson – "D–C to D–C Converter Offers Positive and Negative Bias," — Electronics, May 25, 1970.

Primary Examiner—R. V. Rolinec
Assistant Examiner—Lawrence J. Dahl
Attorney, Agent, or Firm—Leonard R. Cool; Russell A. Cannon

[57] ABSTRACT

A direct current power supply is capable of delivering up to 1 ampere at 60 to 80% power efficiency from a storage battery source, providing a positive DC power output free from inductor-generated type switching transients. The converter embodies a regenerative switching mode means which alternately drives two sets of paired power transistors, turning on each one pair of power transistors for one-half cycle. Each one of the power transistor pair alternately transfers electron charges to a first one of two switch-coupled capacitors, thence to the second one of the two capacitors, and then to a positive voltage terminal. RC clipping circuitry is coupled to each one of the pair of power transistors providing faster resetting times for the power transistors, increasing the converter power efficiency by decreasing storage-time delay. By decreasing power transistor direct shorting time during power transistor switching between transistor pairs, power loss is decreased.

8 Claims, 5 Drawing Figures

NEGATIVE DC TO POSITIVE DC CONVERTER

BACKGROUND OF THE INVENTION

Many electronic devices require more than one direct current constant voltage power source, at positive and at negative potential with respect to ground. Telephone central and subscriber exchanges can typically require several direct current voltage value ranges and polarity. It is technically and economically desirable to supply such power requirements from a minimum number of or a single storage battery source. A negative DC to positive DC converter can provide one simplifying and economical solution to this problem.

D. R. G. Cameron discloses in U.S. Pat. No. 3,522,510 issued Aug. 4, 1970 a DC to DC static converter suitable for generating from a storage battery source a voltage range output different from that provided by the battery. The battery voltage charges a capacitor, which is periodically alternately discharged from first and second halves of a transformer primary winding on a saturable magnetic core. The winding halves are series connected with SCR which are alternately triggered on pulses derived by a flip-flop driven by a unijunction oscillator. Means is provided to discharge the capacitor through the winding reducing the core saturation. The square wave voltage produced on the transformer secondary winding is rectified, filtered, and regulated to a satisfactory DC voltage output.

An earlier disclosure of a positive DC to positive DC voltage converter is contained in U.S. Pat. No. 3,470,446 issued Sept. 30, 1969 to E. H. Berry and F. J. Nola. The converter produces a lower DC positive voltage from a higher DC positive voltage across a load having a common voltage reference point. A plurality of capacitors are alternately charged by a DC source while in series, and then are discharged in parallel to a load having a common reference point with the DC source. Unidirectional conducting means are used to alternately connect the capacitors in series and then in parallel.

A still earlier disclosure of J. K. Mills discloses a power converter using switching transistors driven by an inductance-timed feedback network, in U.S. Pat. No. 3,179,901, issued Apr. 20, 1965. A plurality of transistor switches each directly connect a direct current source to a load. Each transistor switch is alternately switched into a nonconductive and a saturated conductive state by a feedback arrangement. A transformer primary winding is serially connected to the load and the secondary windings are arranged to drive the base electrodes of the transistor switches. An inductance is connected in parallel to the primary winding. The feedback device provides very rapid switching due to the ability to rapidly bring a saturated transistor out of saturation before switching is initiated.

R. F. Downs disclosed a DC to DC converter modification in EDN/EEE on Feb. 1, 1972, pages 48–50, which embodies inductances, thus introducing undesirable waveform transients.

SUMMARY OF THE INVENTION

The power converter provides the relatively efficient conversion of a negative polarity direct current battery power input to a positive polarity direct current output. The inductor-free converter has two opposed pairs of switching power output transistors, each separately capable of handling the power switching load. Each power output switching transistor cyclically transfers electron charges to a first one of two switch-coupled output capacitors, then the charges are transferred to the second output capacitor, and thence to the positive polarity DC power output terminal. Suitable RC sub-circuits embodying clamping diodes provide DC power voltage shaping means, more rapidly turning off the power transistors on their separate disconnects. The clamping diodes provide more rapid reset of the power switching transistors by improving the waveform shapes.

An object of this invention is to provide a DC to DC polarity reversing converter free of inductive type voltage transients.

An additional object of this invention is to decrease the reset switching time of power transistors in a DC converter.

Another further object of this invention is to provide fast reset times for a DC to DC polarity reversing converter, embodying a fast reset regenerative switching mode circuit switching the pairs of power switching transistors.

A still further object of this invention is to provide capacitor means, together with suitably biased diode means, providing for the inversion of power source voltage polarity in a DC converter.

Other objects, features, and advantages of this invention will become apparent in the following description, taken in conjunction with the drawings.

BRIEF DESCRIPTION OF THE DRAWINGS

FIG. 3A illustrates the equivalent operational circuit when the first pair of power transistors is turned on.

FIG. 3B illustrates the equivalent operational power circuit when the second (or alternate) pair of power transistors is turned on.

DESCRIPTION OF THE PREFERRED EMBODIMENT

Figure 1:
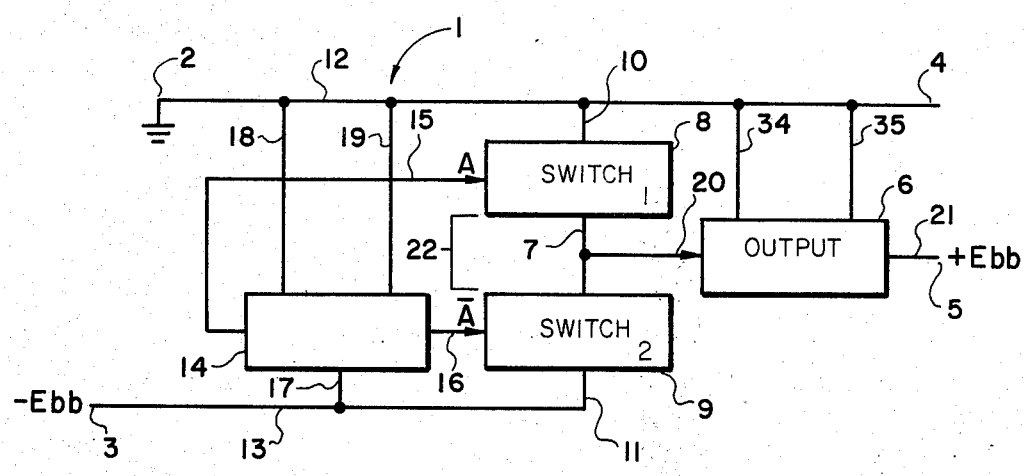
FIG. 1 is a functional block diagram of the converter device of this invention.

Referring to FIG. 1 in detail the −DC to +DC converter apparatus 1 is broadly disclosed as having paired input power terminals, including grounded input terminal 2 and negative input voltage terminal 3, and the paired output power terminals, grounded output terminal 4 and positive output terminals 5. The output capacitor means 6 accepts charges alternately switched to 6 by the paired first PNP and second NPN power switching transistors 8 and 9, respectively, through the conductive lines 7, 20, 10, 12, 11, and 13 as required. Transistors 8 and 9, including auxiliary pulse shaping, quick setting components, form the power switching means 22. The paired power transistors 8 and 9 are complementary switches, cyclically being alternately closed and open.

The regenerative switching mode means 14 is shown connected across the input power conductive lines 12 and 13 by the input power conductive lines 17, 18, and 19. The switching mode means 14 provides complementary switching control signals at low energy levels.

Each one of the power transistors is cyclically switched within a frequency range of 1000 to 8000 Hz by RC feedback timing control means of a regenerative switching mode circuit, which can suitably be a fast reset multivibrator. The regenerative switching circuit also has clamping diodes disposed therein, providing rapid sweep of the regenerative switching transistors, by diverting excess base current into the respective transistor collector and reducing base storage time. A power transistor reset time of approximately 2 $\mu$sec instead of a conventional 30 to 40 $\mu$sec can be achieved. The shortened reset time for the power transistor switches decreases the time providing a direct short path between stored charges in the conducting switch base of the switch being reset open and the nonconducting switch being reset closed.

In telephone communication systems the converter of this invention is preferably operated in the frequency range of 4000 to 8000 Hz, as the audio channel occupies 1 to 4000 Hz, and frequency division multiplex (FDM) equipment may occupy the frequency spectrum above 8000 Hz.

The means 14 provides cycling switching control signal inputs A and $\overline{A}$ through the power transistors 8 and 9 at the selected switching frequency, through conductive lines 15 and 16, respectively. The output capacitor means 6 is connected to the positive voltage output power terminal 5 by the conductive line 21, and to the ground potential by conductive lines 34 and 35.

Figure 2:
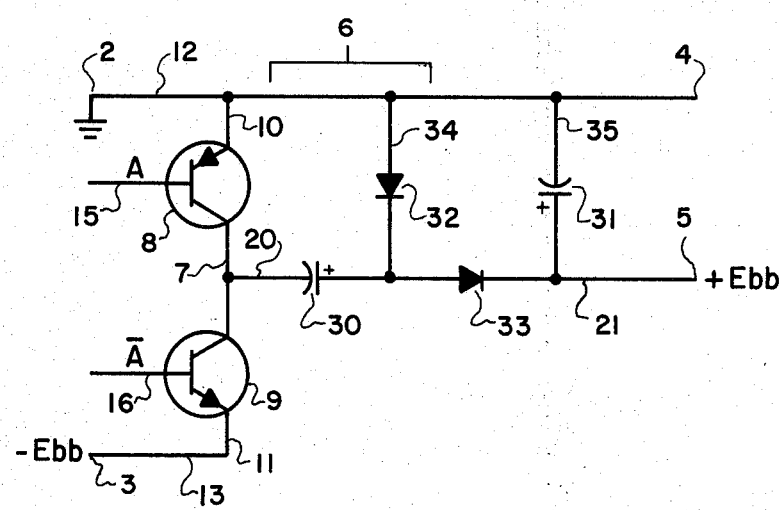
FIG. 2 is a schematic circuit diagram illustrating the power output circuit common to the several converter modifications of this invention.

Referring to FIG. 2, the output capacitor means 6 is illustrated in greater detail in relationship to the switching control signal inputs A and $\overline{A}$ of the respective power transistors 8 and 9. The circuit disclosed in FIG. 2 is basic in the inventive advance of this disclosure, illustrating the capacitor means 6 capable of inverting the polarity of the grounded power source connected to input terminals 2 and 3. The power switching transistors, first power equivalent PNP transistor 8, and second power equivalent NPN transistor 9, are driven by complementary signal inputs A and $\overline{A}$, respectively, from the regenerative switching mode means 14 of FIG. 1. The first capacitor 30 is shown connected in series with the collectors of power transistors 8, 9, and the power diode 32 is forward biased in the conductor lines 34. The second capacitor 31 is conductively disposed by conductor line 35 across the output power terminal pair 4 and 5, and the power diode 33 is conductively connected in series with the positive output voltage terminal 5. Capacitors 30 and 31 are thus connected in parallel during electron charge transfer. The capacitors 30 and 31 may be of the polarized type which provides an additional cost saving.

Figures 3A, 3B:
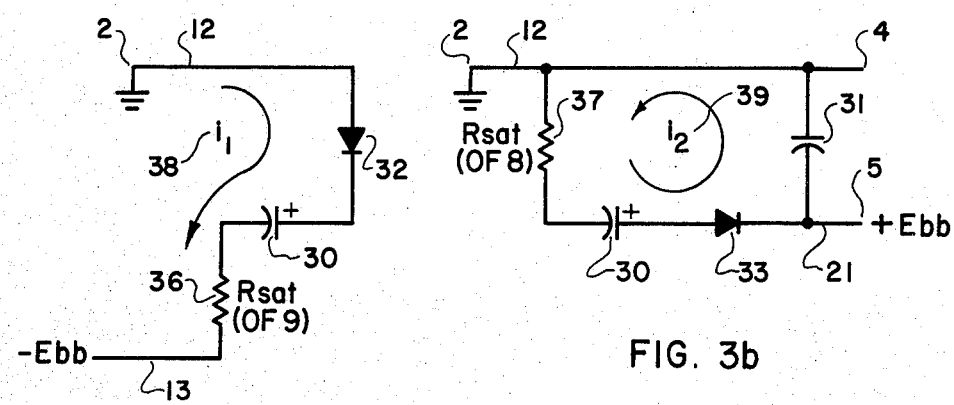

Ideally the operation of the power output circuit of FIG. 2 is cyclically illustrated in FIGS. 3A and 3B. In FIG. 3A, power switching transistor 8 is cyclically cut off by the control signal input A from the regenerative switching mode means 14, and transistor 9 is saturated at its equivalent resistance 36. Forward biased power diode 32 provides charging of power capacitor 30 to $E_{bb}$, less the voltage drop across 36 and across diode 32 (which can typically be 1.2 and 1.5 volts, respectively). During this charging time diode 33 isolates power capacitor 31, and previously charged power capacitor 31 maintains current flow through the load which can be disposed across power output terminals 4 and 5.

On the alternate half-cycle generated by the control signal input $\overline{A}$ from the switching mode means 14, transistor 8 is saturated and transistor 9 is cut off, as illustrated in FIG. 3B. Power capacitor 30 now discharges through diode 33, recharging capacitor 31 to $+E_b$, less the voltage drop of saturation resistance 37 of transistor 8 and the drop of diode 33. The recharge time of capacitor 31 is dependent on the load resistance, the voltage drop across diode 33, and residual charge left on capacitor 31 after discharge.

The charge and discharge times of coupled capacitors 30 and 31 are calculable by known procedure. The converter power limit is reached when the recharge time of capacitor 31 from capacitor 30 becomes appreciable with respect to the discharge time through the resistive load connected across output terminals 4 and 5.

The power transistor's switching rate is important, ranging between 1000 and 8000 Hz. Preferably the switching rate is 4000 – 8000 Hz. The preferable lower frequency limit of 4000 Hz is based on non-interference with the audio channels below that value which are used in telephone communication. The upper frequency limit of 8000 Hz approaches the lower limit of 8 kHz and higher bands used in FDM. The size of both capacitors 30 and 31 is inversely proportional to the switching frequency. High switching rates increase power loss due to switching transients.

Figure 4:
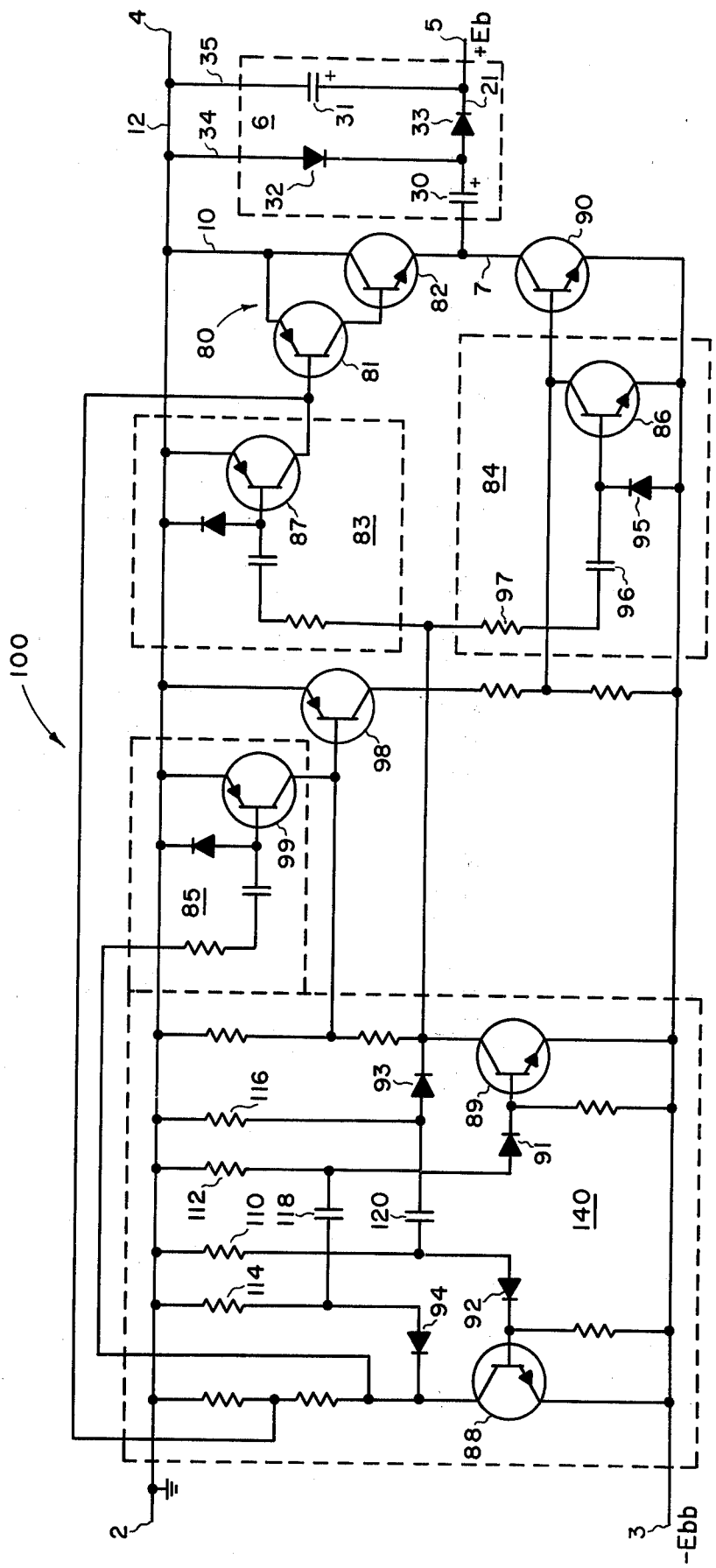
FIG. 4 is a schematic circuit diagram of one modification of the converter, having an astable multivibrator frequency sub-circuit disposed therein.

Referring to FIG. 4 in detail, the power output capacitor means 6 of FIG. 2 is shown disposed in a detailed operational converter 100, including an astable multivibrator switching sub-circuit 140 which is one modification of the regenerative switching mode circuit means 14. The pairs of first power switch equivalent PNP transistors 80 (81 plus 82) and the second power switch NPN transistors 90 and 98 are shown disposed in similar circuit configuration as the respective functionally equivalent transistors 8 and 9 of FIG. 2. Transistor 80 is a bootstrap compound equivalent PNP transistor comprising paired transistors 81 and 82. The power switching transistors 80 and 90 plus 98, each have their switch resetting times typically lowered from 30 – 40 $\mu$sec to 2 $\mu$sec by the use of the respective equivalent first, second, and third diode clamping—transistor sub-circuits 83, 84, and 85, each operatively biased to turn on their respective associated sub-circuit transistors 87, 86, and 99 just as each one of the respective power transistors 80 and 90 are required to turn off.

Typically, a known diode clamping—transistor sub-circuit modification such as 84 comprises a transistor 86 having a low $R_{sat}$ value, a diode 95, a capacitor 96, and a resistor 97 conductively disposed in a sub-circuit which receives the square wave pulse from a half cycle of the multivibrator 140. The typical sub-circuit 84 rapidly switches on the transistor 86, just as the slower switching power transistors 90 and 98 are beginning to turn off. The low saturated resistance ($R_{sat}$) of the transistor 86 provide a rapid sweep of the majority carriers from the base region of power switches 90 and 98, allowing them to reset in approximately 2 $\mu$sec instead of the conventional 30 to 40 $\mu$sec.

Each diode clamping—transistor sub-circuit provides the fast power switching transistor resetting time for its associated power transistor. Thus, sub-circuit 83 clamps and sweeps the bootstrap compound equivalent PNP 80; sub-circuit 84 clamps and sweeps power transistor 90; and sub-circuit 85 clamps and sweeps power transistor 98.

The conventional astable multivibrator circuit is modified to the quick resetting multivibrator 140, wherein diode 92 plus resistor 110 and diode 91 plus resistor 112, protect the base-emitter junctions of regenerative switching transistors 88 and 89, respectively. Diode 94 plus resistor 114 and diode 93 plus resistor 116, respectively, rapidly turn off the collectors of transistors 88 and 89. The coupled diode pairs 92, 94 and 91, 93 and associated resistors provide rapid turn-off of the switching transistors 88 and 89, thus further assisting the rapid reset of the paired pair of power transistors of 80, and 90 plus 98, to 2 $\mu$sec, instead of the conventional 30 to 40 $\mu$sec. Capacitors 118 and 120 are sized and disposed for the 2 $\mu$sec resetting time.

Operationally, when transistor 89 is turned on, then transistor 98 is turned on by the collector current of 89 and subsequently transistor 90 is turned on, providing a charge path through diode 32 to capacitor 30, to rapidly charge up 30 substantially to $+E_b$. When the multivibrator 140 switches, transistor 89 turns off and transistor 88 turns on, transistor 89 tries to turn off transistor 98, which still has stored charges in its base-emitter junction. The dropping wave front of switching transistor 98 is differentiated and applied as a pulse to the transistor 99 which is momentarily turned on, providing a very low impedance from the base of 98, which sweeps the base of 98 free of majority carriers.

The overlap in storage-time delay is inherent in power transistors. The delay time is required to turn off the power transistor base, or drain off the majority carriers from the transistor base region after the base drive has been removed. When paired PNP and NPN power transistors are used in a converter switching mode, during the resetting time interval both transistors present low impedance to ground. Thus, one transistor is turned on by the frequency driving signal, while the second transistor is still on in the storage state. Power is then dissipated by direct shorting across the power transistor pair during the above resetting period. Shaping and clamping sub-circuits are provided in this invention which substantially reduce the resetting time for the power transistor, thus reducing the dissipated power lost in shorting of opposed switching power transistors.

Typically the −DC to +DC converter of this invention converts a source −48 $E_{bb}$ input voltage to a +46 volt $E_b$ output on a 10 ohm load, yielding 10 mA current. A heavier load on similar input voltage yields an $E_b$ of +44 volts at 250 mA current. Energy conversion efficiency typically ranges from 60 to 80%, dependent upon the specific power conversion application configuration.

Obviously other modifications and variations in the improvement in the direct current converters can be made within the scope of my teaching. It is therefore understood that within the scope of the appended claims, the invention can be practiced otherwise than as specifically described.

What is claimed is:

1. In an inductorless d-c to d-c power converter which inverts an input voltage of one polarity from the output conductor of a power source and supplies power to a load with an output voltage of the opposite polarity and of substantially the same magnitude, apparatus for improving the conversion efficiency of the power converter which comprises:

regenerative switching mode means having a pair of input terminals for connection to the output of said power source, said regenerative mode means providing a pair of complementary output switching control signals at a selected switching frequency as well as providing a through-path for power from said source;

power switching means comprising first and second transistor means serially connected across the through-path of said regenerative switching mode means, said first and second transistor means each being operatively connected to receive one of the pair of said switching control signals so as to drive said first transistor means during one-half cycle of said selected frequency and to drive the second transistor means during the alternate one-half cycle; said power switching means providing a power output between a common conductor of said through-path and a junction between said first and second transistor means;

transistor sub-circuit means connected to said power switching means and to said regenerative switching mode means, said sub-circuit means being responsive to said switching control signals to provide low-impedance discharge paths to substantially reduce the resetting time of said power switching means when the first and second transistor means are alternately turned off;

an output capacitor means having an input connected to the power output of said power switching means, said output capacitor means providing at its output a voltage of a polarity opposite to the polarity of the voltage of the power source.

2. Apparatus in accordance with claim 1 wherein said power switching means further comprises:

a first transistor of one conductivity type having the emitter connected to said common conductor of the power source through-path, having the collector connected to the junction and having the base connected to the regenerative mode means, said first transistor being turned on by said control signals during one of said one-half cycles of the selected frequency;

a second transistor of the opposite conductivity type having the collector connected to said junction, the emitter connected to the other conductor of said power source through-path, and having the base connected to the regenerative mode means, said second transistor being turned on by said control signals during the alternate one of said one-half cycles of the selected frequency.

3. Apparatus in accordance with claim 2 wherein said output capacitor means further comprises:

a first capacitor in series with the output lead and having one end thereof connected to said junction;

a first diode having the anode connected to the common conductor and having the cathode connected to the other end of said first capacitor; said first diode being forward biased to charge said first capacitor when said second transistor is biased to conduct by said control signal during one of said one-half cycles of the selected frequency;

a second diode having the anode connected to the other end of said first capacitor and the cathode connected to the output power lead of the output capacitor; and a second capacitor having one end thereof connected to the cathode of said second diode and the other end thereof connected to said common conductor; said second capacitor being charged from said first capacitor when said first transistor is biased to conduct by said control signals during the other one of said one-half cycles of the selected frequency.

4. Apparatus in accordance with claim 1 wherein said power switching means further comprises:
   a first transistor means including a compound pair of transistors of opposite conductivity type, the first transistor of said pair having the collector connected to the common conductor of the through-path, the emitter connected to the junction between said first and second transistor means, and the second transistor of said pair having the emitter connected to the collector of said first transistor of said pair and the collector of said second transistor connected to the base of said first transistor of said pair and having the base connected to receive one control signal from said regenerative mode means; and
   a second transistor means including a third transistor of the same conductivity type as said first transistor, said third transistor having the collector connected to said junction, the emitter connected to the other conductor of the through-path, and having a base; and a fourth transistor, of opposite conductivity type from said third transistor, having the emitter connected to the common conductor of the through-path, having the base connected to receive another of said control signals from the regenerative mode means and having the collector operatively connected to the base of said third transistor and to the said other through-path conductor.

5. Apparatus in accordance with claim 4 wherein said transistor sub-circuit means further comprises:
   a first clamping diode—transistor sub-circuit means conductively disposed between said common conductor and the base of said second transistor of said first transistor means;
   a second clamping diode—transistor sub-circuit means conductively disposed between the other through-path conductor and the base of said third transistor; and
   a third clamping diode—transistor sub-circuit means conductively disposed between said common conductor and the base of said fourth transistor.

6. The converter combination according to claim 5 wherein the regenerative mode means comprises an astable multivibrator circuit.

7. The converter combination according to claim 6 wherein the astable multivibrator circuit has two pairs of diodes, one diode of each pair being positively biased to the base and the second diode of each pair being positively biased to the collector and serially connected to one of the pair of timing capacitors, the junction of said diode and said timing capacitor being connected to the input ground terminal through a resistor, providing pulse shaping and fast resetting time for each one of the pair of switching transistors.

8. The converter combination according to claim 7 wherein the signal output frequency range of said regenerative mode means ranges from 4000 to 8000 Hz.

* * * * *